United States Patent
Ashkinazy et al.

(10) Patent No.: US 6,825,986 B2
(45) Date of Patent: Nov. 30, 2004

(54) METHOD FOR OPTICAL IMAGING IN INCOHERENT LIGHT AND DEVICE FOR CARRYING OUTSAID METHOD(VARIANTS)

(75) Inventors: Yakov Mikhailovich Ashkinazy, Moscow (RU); Andrei Valerievich Cheglakov, Moscow (RU); Anatoly Alekseevich Schetnikov, Podolsk Moskovskaya (RU)

(73) Assignee: Obschestvo s Ogranicennoy Otvetstvennostiju <<INSMAT Teknologiya >>, Moscow (RU)

( * ) Notice: Subject to any disclaimer, the term of this patent is extended or adjusted under 35 U.S.C. 154(b) by 0 days.

(21) Appl. No.: 10/451,650
(22) PCT Filed: Sep. 28, 2001
(86) PCT No.: PCT/RU01/00390
§ 371 (c)(1),
(2), (4) Date: Jun. 23, 2003
(87) PCT Pub. No.: WO02/052492
PCT Pub. Date: Jul. 4, 2002

(65) Prior Publication Data
US 2004/0051943 A1 Mar. 18, 2004

(30) Foreign Application Priority Data
Dec. 26, 2000 (RU) ........................................ 2000132488

(51) Int. Cl.[7] .............................................. G02B 27/10
(52) U.S. Cl. ........................ 359/619; 359/621; 359/626
(58) Field of Search ................................. 359/619, 621, 359/626, 629; 349/5, 95

(56) References Cited

U.S. PATENT DOCUMENTS 5,161,059 A * 11/1992 Swanson et al. ............. 359/565
2004/0051943 A1 * 3/2004 Ashkinazy et al. ......... 359/432

* cited by examiner

Primary Examiner—Huy Mai
(74) Attorney, Agent, or Firm—Myron Greenspan; Lackenbach Siegel, LLP

(57) ABSTRACT

The invention refers to the methods and means of conversion of electromagnetic radiation (mainly belonging to the optical range) with the purpose of forming of objects' images (mainly of spatially extended ones) within incoherent light. In an Optical System (OS) the following procedures are being performed: pre-defined distortion of optical motion of rays by means of Amplitude-Phase Mask (APM); optical-electronic conversion of distorted image of object 6 and deduction of the distortions inserted by the APM and by OS. Deduction of distortions is arranged by means of accorded spatial filtration of the distorted image. Distortion of optical motion of rays is accomplished in the direction that is close to the orthogonal one in regards to the distortions brought in by defocusing and by aberrations of the OS. In the meanwhile, the possibility to receive the function of distortions that possesses rotary symmetry is being secured. A device meant for implementation of the method includes an OS with at least one lens 1, 2, 3, 4 and 5, as well as positioned in series: a facility for distortion of optical motion of rays realized in form of the APM, optical-electronic converter (9) of the distorted image and finally, a device for deduction of distortions arranged in the form of accorded spatial filter

8 Claims, 4 Drawing Sheets

US 6,825,986 B2

METHOD FOR OPTICAL IMAGING IN INCOHERENT LIGHT AND DEVICE FOR CARRYING OUTSAID METHOD(VARIANTS)

TECHNICAL FIELD

The invention refers to the field of optics (precisely to the methods and means of optical modification of electromagnetic radiation) and can be widely applied at forming of optical imaging of the objects (mainly of spatially extended ones) within incoherent light with the purpose of quality improvement of the perceived images.

PREVIOUS TECHNICAL LEVEL

According to the technical level common acknowledgement is attributed to the method of forming of an optical image in the incoherent light, which is based on the application of focusing optical elements (e.g. a biological subject's lens or the objective of movie and photo cameras).

One of the ways of partial removal of the defects detected consists of diminishing the numerical aperture of the optical elements used (i.e. diminishing of the size of entrance pupil of the optical system). However, this method causes a decrease of illumination in the image formed, proportionally to the decrease of the entrance pupil's area, as well as leads to lowering of optical system's resolution in general.

Another method of object's-optical image's forming within incoherent light as well known from the technical level, is based on the change of transparency of the optical element in the direction from the center toward the peripheral area of the entrance pupil. In particular, in case of Gaussian law of transparency amendment, the dimensions of diffractive image of a point object decrease and consequently, resolution of the whole optical system increases and accordingly the quality of the formed image of original object improves. (J. Ojeda-Castaneda at ol., "High Focal Depth By Apodiration and Digital Resporation", Appl. Optics, 27, No. 12, 1988; M. Mino, Y. Okano "Improvement in the OTF of Defocussed Optical System Through the Use of Shaded Apertures", Appl. Optics, 10, No. 10, 1971).

Nonetheless, similar to the cases mentioned above, the present method acknowledged from the technical level, decreases the impact of focusing errors only partially (in case of shifting of original object from the plane of optimal focusing of the optical system or in case of the said object's extension along the optical axle of the system) due to certain extent of reduction of the formed image's illumination.

We know another way of optical image forming of an extended object within incoherent light along with the device of realization that secures the feasibility to diminish the error of defocusing through implementation of light rays of the specific phase mask (U.S. Pat. No. 5,748,371).

The technical solution mentioned implies one or several lenses to form the image on the surface of optical-electronic converter. In the meanwhile, one of the main planes of the optical system has a cubic phase mask installed, by means of which optical transfer function is being changed (i.e. optical motion of the rays is being distorted) for the said system (that forms the image) so that it (optical transfer function) remains practically constant at defocusing of the optical system inside a relatively wide range. Further on, the formed distorted image is being fixed with the help of optical-electronic converter and the final image without any distortion is restored from it by means of accorded spatial filtration with assistance of a digital filter accomplished hardware-wise or in a numerical form through a PC.

The method and device for its implementation analyzed in the present report allow in the course of accomplishing procedure to decrease affecting of defocusing errors over the quality of object's formed image as well as permit accounting and lowering of residual aberrations of the optical system.

Disadvantages of the quoted known technical solutions should be attributed to the higher requirements to the quality of optical-electronic converter because of the necessity to secure numeral ization of the signal in every particular point of the image not lower than 10 . . . 12 bits in order to receive high quality image. At the presence of noise of the receiver and/or at decreasing the number of quantization levels of the signal, the quality of restored image considerably deteriorates and the effect of depth enlargement of sharply imaged space is getting decreased.

Besides, in the known technical solutions analyzed above, the distortions of a point's imaging brought in to the optical system by means of a cubic phase mask are defined by individual derivatives (conforming to the pupil coordinates) from the function of a $(x^3+y^3)$ kind. It means that directions of the distortions mentioned to the considerable extent coincide with directions of distortions caused by the defocusing which leads to "smearing" of the restored image of the point source in case of shifting of the latter from the focus of optical system.

As the closest to declared subjects of the invention one might consider a method known from the technical level, dealing with forming of the optical image of an extended object within incoherent light and the device for its implementation that are based on the combined application of amplitude and cubic phase masks (U.S. Pat. No. 6,097,856).

According to this method the following procedures are accomplished in series inside the optical system equipped with at least one lens: pre-set distortion of the rays' optical motion (i.e. modification of optical transfer function of the said system) by means of the amplitude-phase mask inserted to the system; optical-electronic conversion of the intermediate distorted object's image formed by optical system and following deduction of distortions brought in by amplitude-phase mask and by optical system in general through accomplishing of accorded spatial filtration of the intermediate image mentioned afore.

A device meant to form optical image of an object within incoherent light (to implement the method described above) includes an optical system with at least one lens as well as the placed in series along the rays' motion direction facility to distort the optical motion of the rays (i.e. to change the optical transfer function of the said system) in the form 'of amplitude-phase mask, optical-electronic converter of the intermediate distorted image generated by optical system and finally a device for deduction of distortions brought in by amplitude-phase mask and optical system in general. The last named facility is digitally realized in the PC in form of totalized accorded spatial filter (used for the purpose of coordinated spatial filtration of distorted intermediate image). These technical solutions carry the same disadvantages as attributed to the method analyzed and the device for its implementation according to the U.S. Pat. No. 5,748,371.

It is worth emphasizing that every technical solution quoted above requires digital processing of the image formed that incurs additional computing devices and extra time to process initial data. Not only this complicates the structure of the optical system, but as well excludes the chance to receive a restored image in real time scale (meaning impossibility to apply the known technical solutions in the systems that require higher speeds of initial data's processing).

In addition to that, distortions in the imaging of point light source, caused by insertion to the system of cubic phase mask (which function of phase delay looks like: $\Delta\Phi=k(x^3+y^3)$), are defined by individual derivatives of the mentioned function according to the pupil's coordinates "x" and "y", meaning that they are proportional to "$x^2$" and "$y^2$". In the meanwhile, distortions brought in by defocusing are proportional to "x" and "y" accordingly and possess the identical direction.

In this regard, the quality of restored image considerably depends on the value of defocusing and consequently, it is not feasible to restore the ideal image of the source, especially in the case of a spatially extended object.

INVENTION EXPOSURE

The basis of declared invention has been formed by the problem of creation of such a method of the object's optical image generation within incoherent light along with device construction to realize the method, by means of which it would turn out possible to obtain in real time scale high quality restored image of the initial object that stays invariant regarding the defocusing.

The problem put with reference to the "method" subject of invention is being realized as follows. The method of forming of object's optical image within incoherent light conforming to which below mentioned procedures are being accomplished in series inside the optical system equipped with at least one lens: preset distortion of optical motion of the rays by means of amplitude-phase mask inserted to the system; optical-electronic conversion of the formed distorted intermediate image and following deduction of distortions, brought in by amplitude-phase mask and by the whole optical system through performance of accorded spatial filtration of distorted intermediate image. In conformance to the invention, the pre-defined distortion of optical motion of the rays is being accomplished in the direction, which is close or identical to the orthogonal ones in regards to the distortions caused by defocusing and by aberrations of the optical system together with securing of rotary symmetry of the function of pre-set distortion.

It would be optimal if the ratio between meridional and sagittal components of the pre-defined distortion brought in to the motion of rays is set so that once the optical system has defocusings equaling by the absolute value with opposite marks, the points of light beams' crossing (passing at the identical and/or at close value distances from the center of amplitude-phase mask) lie in the plane of optimal focusing of intermediate image in the circular zone of the circumference of the same radius the value of which exceeds the values of distortions caused by defocusing and by aberrations of the optical system inside the limits of each mentioned circular zones.

For the purpose of optical-electronic conversion of intermediate image it is expedient to apply an addressed optical spatial light modulator, while the accorded spatial filtration of such image within incoherent light should be carried out at the implementation of double optical-Fourier-transforming.

It is also reasonable in the course of forming of distorted intermediate image of the object through pre-set distortion of optical motion of the rays via amplitude-phase mask to impart circular rotary movement to the latter.

The problem put with reference to the "device" subject of invention (conforming to one of the construction variants) is being realized as follows. A device meant to form optical image of an object within incoherent light includes an optical system with at least one lens as well as the placed in series along the rays' motion direction facility to distort the optical motion of the rays in the form of amplitude-phase mask, optical-electronic converter of the intermediate distorted image generated by optical system and finally a device for deduction of distortions brought in by amplitude-phase mask and optical system in general. According to the invention, in such a system the amplitude-phase mask is comprised of two coaxially and confocally installed lenticular screens with placing of lenses in each one of them along the concentric circles. Furthermore, at least one lenticular screen is mounted with secured option of a turn around the optical axle of the system to the angle regulated by the value of pre-defined distortion of the optical motion of rays of the said system.

The problem put with reference to the "device" subject of invention, conforming to another construction variant is being realized as follows. A device meant to form optical image of an object within incoherent light includes an optical system with at least one lens as well as the placed in series along the rays' motion direction facility to distort the optical motion of the rays in the form of amplitude-phase mask, optical-electronic converter of the intermediate distorted image generated by optical system and finally a device for deduction of distortions brought in by amplitude-phase mask and optical system in general. Conforming to the invention, in such a system at least in one of the lenticular screens of the amplitude-phase mask, the lenses are made in the form of diffractive optical elements with strokes' direction of diffractive structure close to the radial direction and with monotonous changing of the said direction and of the strokes' frequency in proportion to the increase of distance from the center of diffractive element with the possibility to secure invariant status of the impulse response of the optical system with reference to defocusing. The strokes of diffractive structure of a diffractive element can be made with a triangular profile, the height of which is selected according to provision of securing the maximum diffractive efficiency of the mentioned structure.

The problem put with reference to the "device" subject of invention, according to one more construction variant is being realized as follows. A device meant to form optical image of an object within incoherent light includes an optical system with at least one lens as well as the placed in series along the rays' motion direction facility to distort the optical motion of the rays in the form of amplitude-phase mask, optical-electronic converter of the intermediate distorted image generated by optical system and finally a device for deduction of distortions brought in by amplitude-phase mask and optical system in general. Conforming to the invention, direction of the strokes of diffractive structure of the optical element is determined by the equation of the following pattern:

$$\Phi=\Phi_i+k\rho^2, \text{ where:}$$

$\Phi$ and $\rho$—mean normalized polar coordinates in the plane of amplitude-phase mask;

$\Phi_i$—means a polar angle that defines the direction of i-th stroke in the point of (coordinates) origin;

k—means a constant coefficient;

with the option of securing the invariant status of impulse response of the optical system with reference to defocusing.

In the present case the strokes of diffractive structure of diffractive element can be also made with a triangular profile, the height of which is selected basing on the provision of procurement of maximum diffractive efficiency of that structure.

BEST VARIANT INVENTION'S IMPEMENTATION

Figure 1:
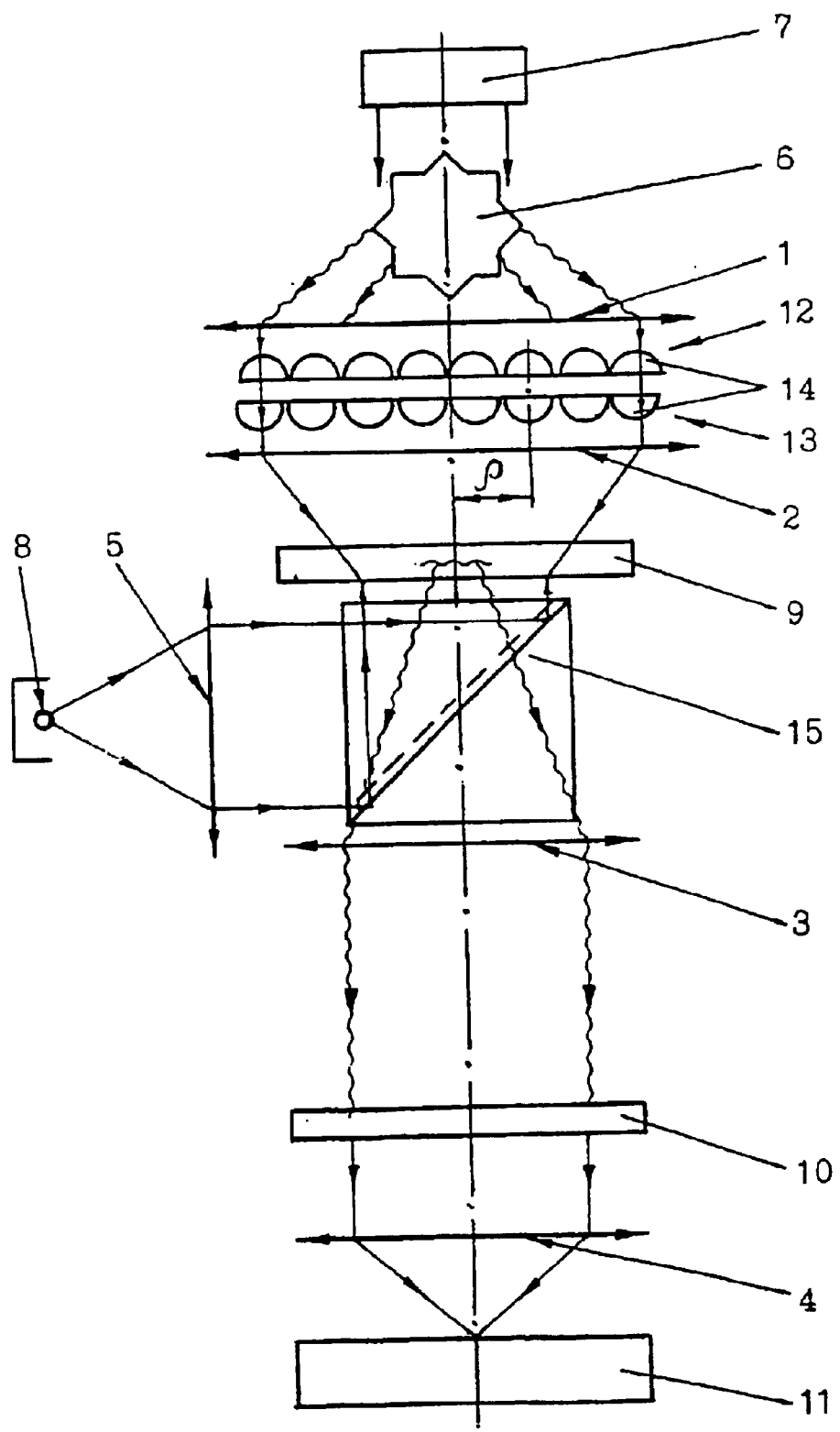
FIG. 1—schematic diagram of the device meant to form optical image of an extended object with adjusted depth of sharply imaged space, with two lenticular screens implemented as an amplitude-phase mask.

Physical principle of realization of the patented method of forming of object's optical image within incoherent light consists of the following.

In an optical system with one or several lenses 1, 2, 3, 4 and 5 (FIG. 1) by means of the amplitude-phase mask a pre-defined distortion of the optical motion of rays is performed (i.e. the change of transfer function of the said system) which are reflected by the initial object 6 illuminated by incoherent light (e.g. by means of the radiation source 7). Distortion of optical motion of the rays is being accomplished in the direction that is close (mainly identical) to the orthogonal one with reference to distortions caused by defocusing and by aberration of the optical system. In the meanwhile, rotary symmetry of the function of pre-set distortion is secured. It means that at a turn of the amplitude-phase mask around its axle, distortions inserted to the optical motion of the rays are not changing. The distortion of the rays' motion can be accomplished through various means known from the technical levels and which means are listed below along the description of different variants of the devices required for implementation of the method patented. Further on an optical-electronic modification of the formed distorted intermediate image and following deduction of distortions are carried out (brought in by the amplitude-phase mask and by the whole optical system) by means of running of an accorded spatial filtration of the intermediate image.

Conforming to the patented method, the ratio between meridional and sagittal components of the pre-defined distortion (inserted to the motion of rays) is being set so that once the optical system has defocusings equaling by the absolute value with opposite marks, the points of light rays' crossing (passing at the identical and/or at close value distances from the center of amplitude-phase mask) lie in the plane of optimal focusing of intermediate image in the circular zone of the circumference of the same radius. The value of the said radius far exceeds the values of distortions caused by defocusing and by aberrations of the optical system inside the limits of each mentioned circular zones. This secures a considerable gain in the illumination of the formed image compared to the previously quoted objects, known from the technical level.

It is expedient to implement an AOSLM (Addressed Optical Spatial Light Modulator) for the purpose of optical-electronic modification of the distorted intermediate image. At the same time the accorded spatial filtration of the mentioned image should be performed within coherent light (e.g. generated by the radiation source 8) at the use of double optical Fourier-transforming.

In the course of forming of intermediate object's image (through a pre-set distortion of the optical motion of rays by means of the amplitude-phase mask) it would be optimal to impart circular rotary movement to the latter (meaning to say the mentioned mask). As the result of such procedure at the forming of distorted intermediate image of the object, heterogeneities' evening out is secured that are caused by the error of amplitude-phase mask's creation. Besides, the impulse response of the entire system is being averaged out.

Since in the declared method of forming of optical image of the object (mainly an extended one) within incoherent light, the distortion of optical motion of the rays (i.e. optical transfer function of the optical system) is performed in the direction close (mainly coinciding with) to the orthogonal one (with reference to the distortions caused by defocusing and by aberrations of the optical system), an intermediate distorted image of a point source practically does not change even at the defocusing errors reaching a half magnitude of the distortions' values inserted by the amplitude-phase mask. It can be explained by the fact that light rays shift at a tangent to the spot of dispersion maintaining almost constant their position regarding the center of the image. In the while, distribution of illumination inside the spot (due to the rotary symmetry of the distortions' function) stays almost invariable. Consequently, at performing of the accorded spatial filtration, practically undistorted image of the source is restored (meaning to say the source of the original object).

Figure 2:
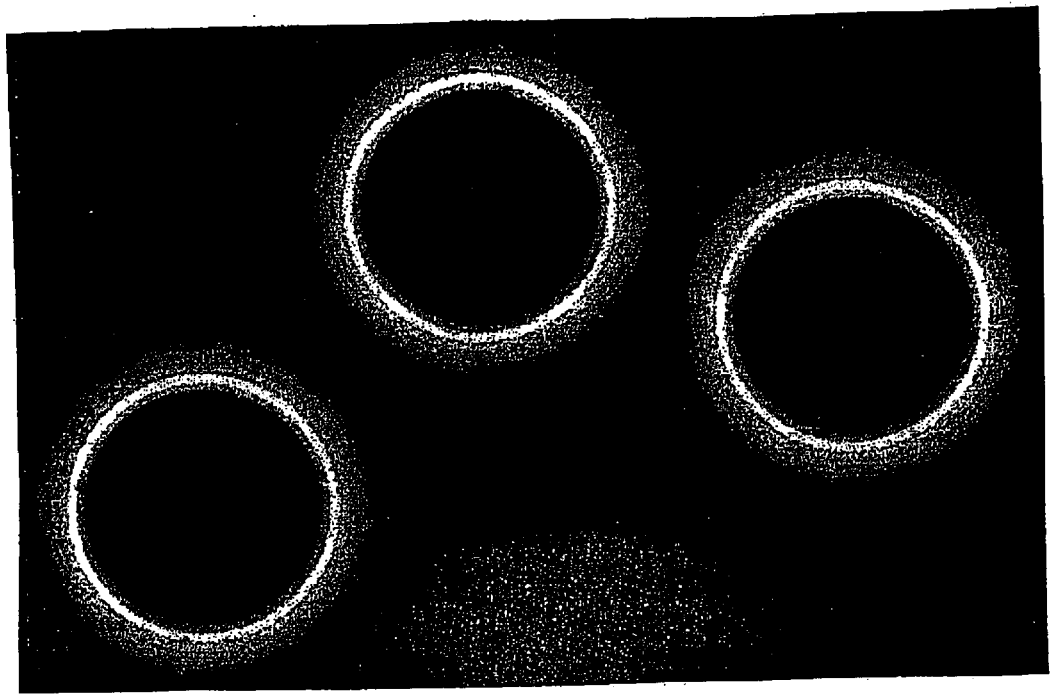
FIG. 2 and FIG. 3—illustrate the distorted intermediate images of three point sources (objects) in the plane of optical-electronic converter at the optimal focusing and maximum defocusing respectively, obtained in an optical system by means of one of modifications of the amplitude-phase mask.
Figure 3:
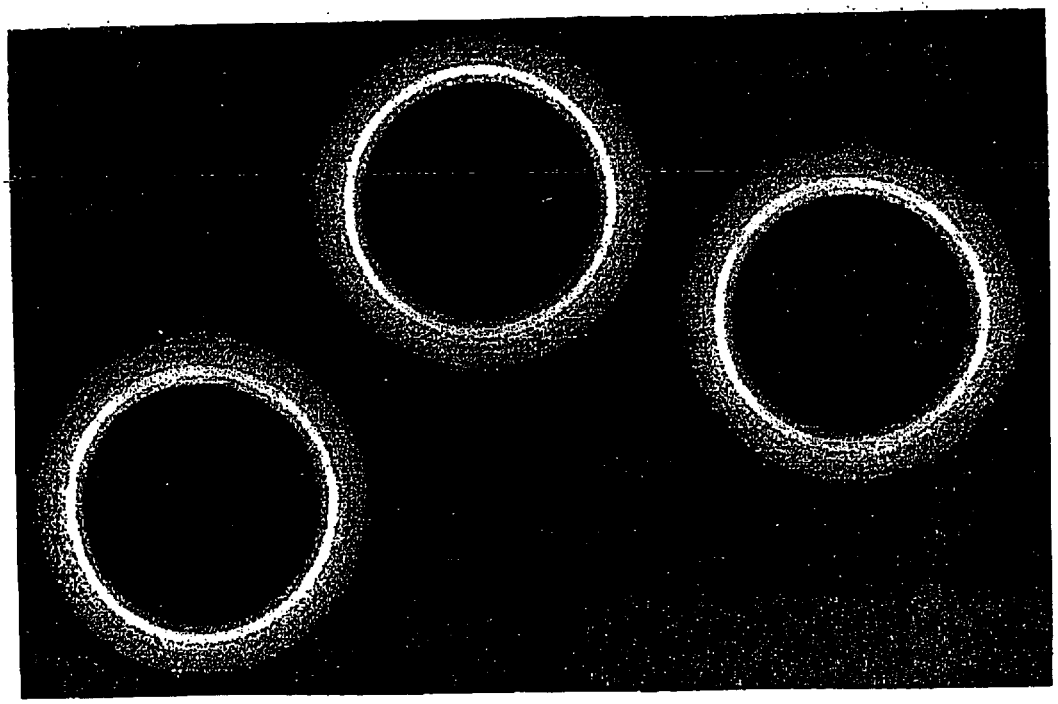

FIGS. 2 and 3 expose the distorted intermediate images of three point sources (objects) in the plane of optical-electronic converter 9 whereas the said sources are located in the plane of optimal focusing (FIG. 2) and at maximum defocusing of the optical system (FIG. 3), obtained through modification of amplitude-phase mask. It can be easily detected that distribution of illumination within the spot possesses the shape of a ring and remains almost invariable at the defocusing (only a minor amendment of the interior diameter of the ring can be noticed). Since the impulse response of the system remains constant at defocusing, it is feasible to construct an accorded spatial filter 10 provided the object is located within the plane of optimal focusing. The filter 10 secures deduction of distortions in the final (e.g. in visually perceived) image 6 of the object at a random defocusing of the optical system.

A device meant to form optical image of the object 6 (mainly an extended one) within incoherent light, conforming to one of the variants of realization (item 5 of the invention's formula and FIG. 1 of the graphic material) includes an optical system with one or several lenses 1, 2, 3, 4 and 5, as well as placed in series (along the direction of the rays reflected from the initial object 6) a facility in form of amplitude-phase mask meant for distortion of optical motion of rays, optical-electronic converter 9 for the formed distorted intermediate image, a device for deduction of distortions brought in by the amplitude-phase mask and by the whole optical system, accomplished as-an accorded spatial filter 10, as well as a receiver 11 of the image. Optical-electronic converter 9 of the formed distorted intermediate image can be made for instance as an addressed optical spatial light modulator. The receiver 11 of the image can be arranged as a grid of point diaphragms with lenticular screens and PZS-cameras*. Amplitude-phase mask in the present variant is made in the form of two (coaxially and confocally positioned) lenticular screens 12 and 13 with placing of lens 14 (in each screen 12 and 13) along the concentric circles. At the same time at least one of the lenticular screens 12 and 13 is mounted with secured option of turning around the optical axle of the system by the angle, which magnitude is regulated by the value of pre-defined distortion of optical motion of the rays of the above mentioned system.

Figure 4:
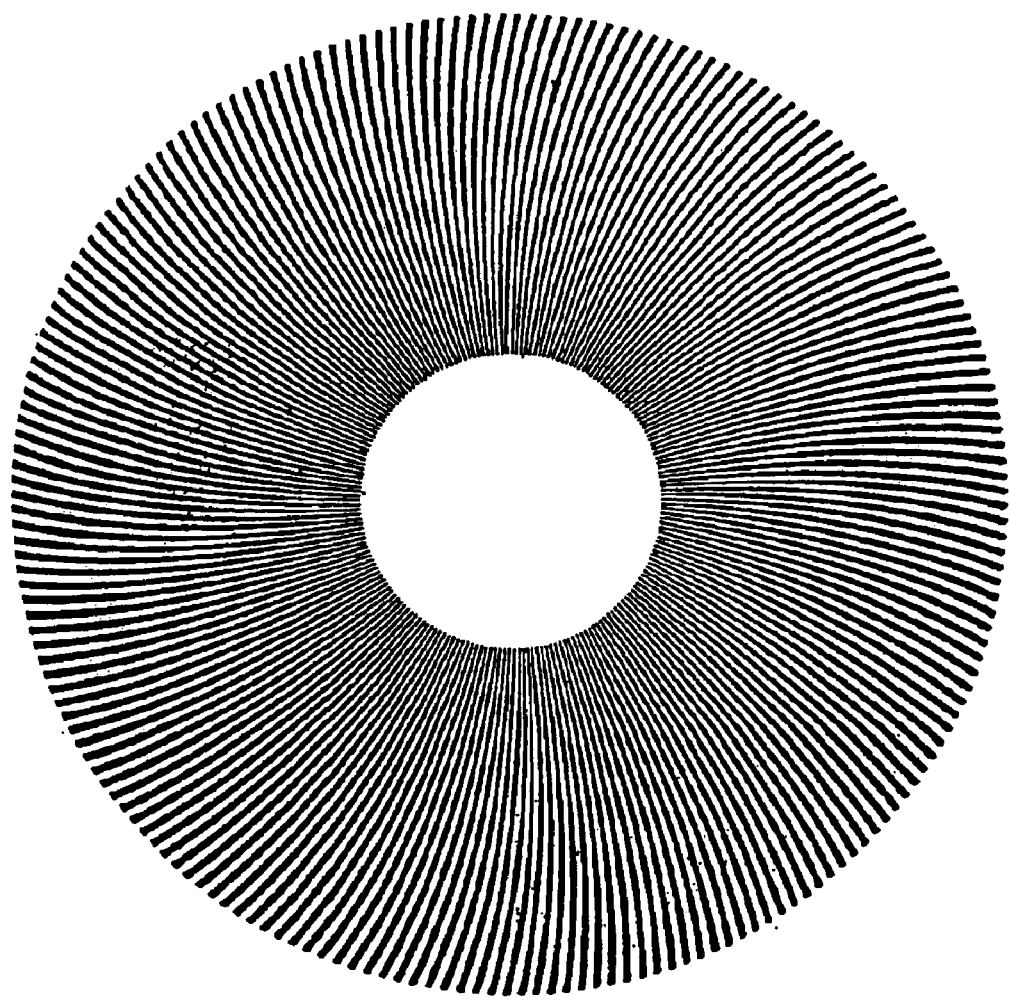
FIG. 4—a variant of making the amplitude-phase mask in form of diffractive optical element with curvilinear strokes.
Figure 5:
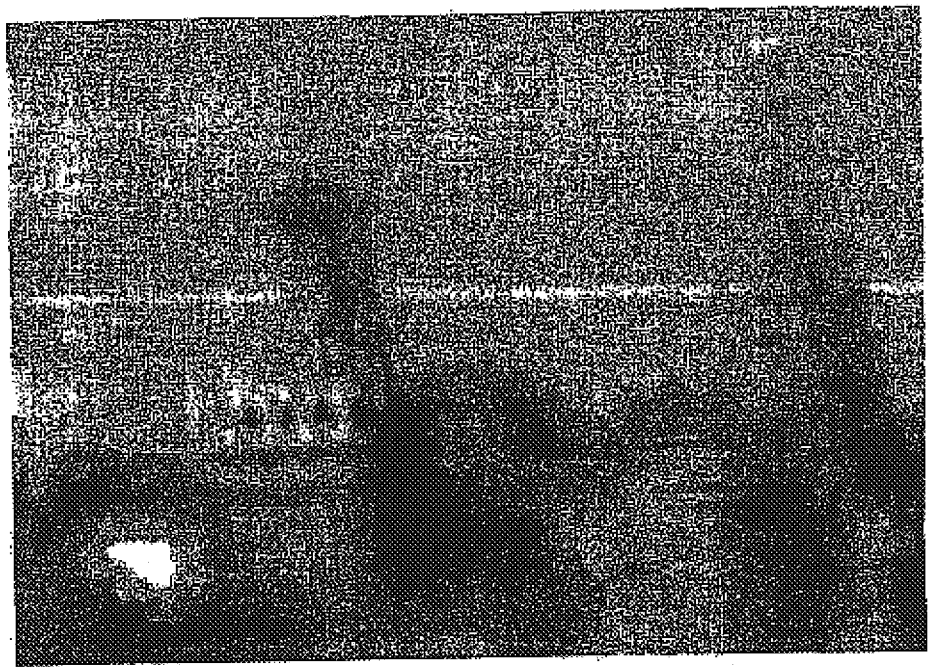
FIG. 5—intermediate image of extended object, distorted under the impact of defocusing and amplitude-phase mask.
Figure 6:
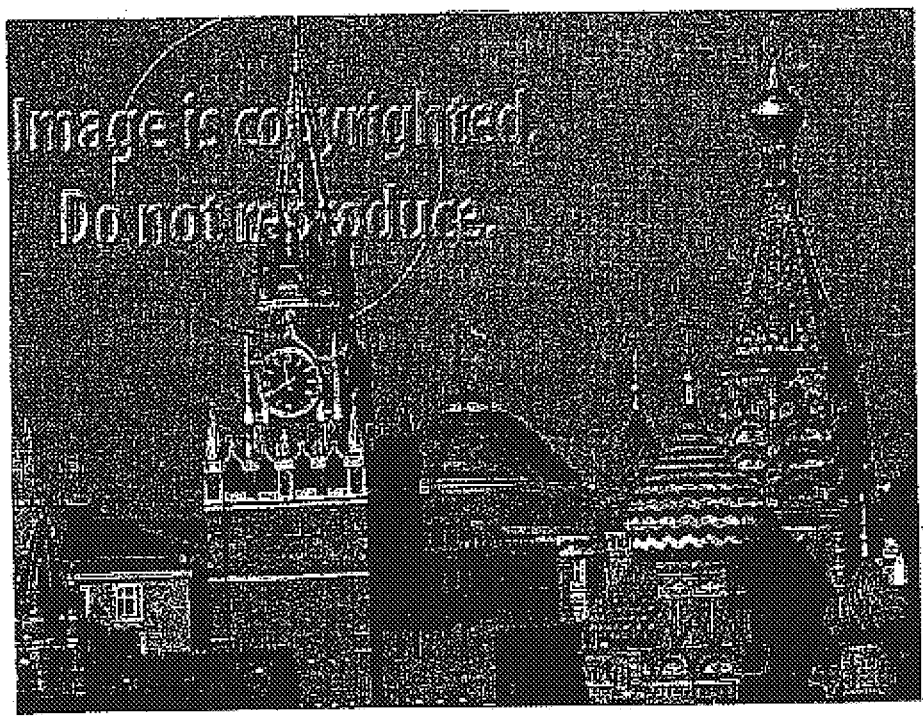
FIG. 6—restored image of the object according to the FIG. 5.

A device meant to form optical image of the object 6 (mainly a spatially extended one) within incoherent light, (conforming to another variant of realization according to item 6 of the formula) differs from the previously described variant only in that at least within one of the lenticular screens 12, 13 of the amplitude-phase mask, the lenses are made in form of diffractive optical elements (see FIG. 4) with strokes' direction of diffractive structure close to the radial direction and with monotonous changing of the said direction and of the strokes' frequency in proportion to the increase of distance from the center of diffractive element. The strokes of diffractive structure of a diffractive element can be made with a triangular profile. The height of the profile is selected according to provision of securing the maximum diffractive efficiency of the mentioned structure.

Conforming to one more variant of the device realization, the form of strokes of diffractive optical element along the radial direction is determined by the equation of the following pattern:

$$\Phi = \Phi_i + k\rho^2, \text{ where:}$$

$\Phi$ and $\rho$—mean normalized polar coordinates in the plane of amplitude-phase mask;

$\Phi_i$—means a polar angle that defines the direction of i-th stroke in the point of (coordinates) origin;

k—means a constant coefficient;

with the option of securing the invariant status of impulse response of the optical system with reference to defocusing.

In the present case the strokes of diffractive structure of diffractive element can be also made with a triangular profile, the height of which is selected basing on the provision of procurement of maximum diffractive efficiency of that structure.

The operation principle of the first variant of realization (in conformance to item 5 of the formula) of the device meant to form the optical image of an extended source within incoherent light (according to FIG. 1) is as follows.

The pencils of rays from the source 7 of incoherent light, dispersed by the monitored object 6 are transferred by the objective (lens 3) over to the amplitude-phase mask made in the form of two coaxial and confocal to each other lenticular screens 12 and 13. Each elementary lens 14 of the first screen 12 forms a diminished image of the object 6 in its focal plane. Its corresponding lens 14 of the second screen 13 re-transfers the image (of object 6) to the infinity. At a turn of one of the screens 12 or 13 around its axle by some angle "$\alpha$", the image of object 6 within the focal plane shifts along the tangential direction by the magnitude of $\Delta=\alpha\rho$ where $\rho$—means the distance from the center of corresponding screen 12 or 13 to the axle of corresponding elementary lens 14. In the outcome, all elementary pencils of rays at the exit of screen 13 deviate along the tangential direction by the angle $\psi=\alpha\rho/f$ where f—means the focal distance of elementary lens 14 of the corresponding screen. Further on all elementary pencils of rays are being focused by the objective (lens 2) on the surface of optical-electronic converter 9. At positioning of the object 6 in the plane of optimal focusing of the optical system and at $\alpha=0$ we obtain an undistorted image of the object 6. If $\alpha \neq 0$, then any point of the object 6 is being transformed to a spot of dispersion in the form of a circle of almost constant intensity with a diameter approximately equaling to $D=2F\ \psi_{max}$, where F—means the focal distance of the corresponding objective.

If the optical system possesses defocusing, a shift of rays occurs in the axle section of the system in proportion to the radius "$\rho$" and to the value of defocusing "$\delta$". Summary impact of the distortions inserted to the motion of rays by defocusing and by amplitude-phase mask practically does not cause a modification of dispersion spot, provided the ratio $F\ \alpha/f >> \delta/F$ is secured. Considering the fact that distortions brought in by amplitude-phase mask and by defocusing are almost orthogonal, a relative amendment of the dispersion spot's diameter will be in proportion to the square of the ratio $(\delta/F)/(F\alpha/f)$. For the comparison reason—at the implementation of cubic phase mask, the change of diameter of dispersion spot occurs in proportion to the first power of the mentioned ratio. It means that subject to the parity of all other provisions, declared method and device for its implementation allow to considerably increase the depth of sharply imaged space.

Now that we clarified the conditions required for the impulse response of the system to remain invariable at defocusing, let us return to analysis of the scheme exposed in FIG. 1

To restore undistorted image of the object 6 it is required to accomplish accorded spatial filtration of the intermediate distorted image obtained within incoherent light. The said procedure can be performed as by means of the specific digital processor, as well as by means of application of optical correlator. For this particular purpose, according to the scheme depicted on FIG. 1, the suggested device implements addressed optical spatial light modulator 9. Highlighting of the mentioned modulator 9 is arranged (through polarized cube 15) by means of coherent light from the side of the surface, opposite to the one that holds the formation of intermediate distorted image, while the coherent light dispersed by modulator 9 gets subject to spatial filtration with the help of optical system of double Fourier-transforming that includes objectives (lenses 3 and 4) and accorded spatial filter 10, placed in their joint focus. As accorded spatial filter 10 we can use for instance Fourier-hologram of the intermediate distorted image of point source at its positioning within the plane of optimal focusing of the optical system. As the result of filtration, the back focus of corresponding objective (lens 4), receives undistorted image of the object 6, which is being further read by means of the image receiver 11 made in form of, for example, a digital camera. It is worth mentioning that the modern industry is far behind the possibility of resolving the problem of manufacturing of high-speed addressed optical light modulators with high spatial resolutions capable of transferring halftone images, although there are certain perspectives of finding the solution.

Operational principle of another variant of the device construction (according to item 6 of the formula) is based on insertion of distortion to the motion of light rays by means of the amplitude-phase mask in the form of DOE (Diffractive Optical Element). As it has been stressed above, conforming to item 2 of the invention formula, the present method works with maximum efficiency if at defocusing of the opposite marks, elementary pencils of rays passing through amplitude-phase mask at a constant distance "$\rho$"

from the center of the said mask, cross the plane of forming of intermediate distorted image at the zone of circumference of identical radius, depending upon "ρ" and big enough compared to the values of distortions caused by defocusing and by aberrations of the optical system within the limits of every mentioned ring zones. To obtain such an effect, a DOE with radial strokes can be used, provided the frequency of strokes at the peripheral zone is high enough in order to secure invariability of the impulse response of the optical system and consequently, invariability of optical transfer function in regards to the defocusing. To improve efficiency of conversion, DOE can be divided into narrow ring zones where the period of diffractive structure is kept approximately constant so that identical diffractive orders are focused on the circumferences of the same radius, creating the image of a point source in form of a set of narrow diffractive rings, whereas in an ideal case (for a DOE with "glitter") creating a single ring with smooth decrease of intensity toward the peripheral area. On implementation of such kind of amplitude-phase mask, provided the parity of all other conditions, we obtain a considerable gain in illumination of dispersion spot (compared to the prototype) allowing to lower and ease the requirements to the optical-electronic converter (we could do with 8-bit ADC instead of 10–12 bit Analogue-Digital Converter).

Considering another possible variant (see FIG. 4), the shape of strokes of DOE has the form conforming to the function $\Phi=\Phi_i+k\rho^2$, where:

$\Phi$ and $\rho$—mean normalized polar coordinates in the plane of amplitude-phase mask;

$\Phi_i$—means a polar angle that defines the direction of i-th stroke in the point of (coordinates) origin;

k—means a constant coefficient, which depends upon the wave-length of implemented radiation, upon extension of the object and on the number of strokes of DOE.

Similar to the case described afore, DOE can be divided to the ring zones; however, the difference lies in the fact that identical diffractive orders are being focused on the circles of different radius and consequently, do not cause interference (pattern) effects that lead to the change of impulse response of the system.

On implementation of the Amplitude-Phase Masks (APM), it would be expedient to imply apodization of the entrance pupil by means of the amplitude mask with zero transmission in the central zone and with smooth increase of the transmission coefficient toward the peripheral area in order to improve homogeneity of light distribution within the spot of dispersion and with the purpose of decreasing its transverse dimensions (ring's width).

Stroke's profile of the DOE should preferably have a triangular form to obtain the maximum diffractive efficiency of the APM. In such a case, almost entire light energy will be transmitted to the first power of diffraction thus considerably lowering the level of the background within the formed intermediate distorted image and easing the restoration of undistorted image of object 6.

Industrial Application

Therefore, declared method and device for its implementation can by applied on a wide scale with the purpose of conversion of electromagnetic and other types of radiation, provided at the forming of object's image within corresponding field it is required to secure invariability of the image regarding defocusing or other aberrations. The present application area first of all comprises scanning converters of high resolution, devices meant to read the data from the mobile carrier, various facilities designed to measure physical and geometrical characteristics of 3-D objects, devices meant to recognize images, cinematographic, photo and television technical means, introscopy devices implemented for roentgen, optical and acoustic ranges, etc.

In addition to that, for the method and device suggested, as the amplitude-phase mask any device can be used, provided the latter causes deviations of corresponding pencils of radiation toward the direction that is orthogonal to aberrations of the system that forms the image (in common case arranging projective modification of the data signal). Amplitude-phase mask can be accomplished in form of a separate element (or as two elements—amplitude and phase masks), or it can be combined with the element that builds the image. For instance, a Diffractive Optical Element (DOE) can simultaneously perform the function of amplitude-phase mask and the function of a focusing element, provided the required amendment of strokes' shape is secured.

It is worth emphasizing that considerations disclosed above by no means limit the field of application of the suggested method or device for its implementation solely to the optical range of electromagnetic radiation in consequence of the use of optical-electronic conversion, since any other means is applicable, subject it is sufficient to transform the data signal impacting the system into the form accessible for following action and comprehension.

What is claimed is:

1. The method of optical image formation within incoherent light in an optical system with at least one lens (1, 2, 3, 4, 5), said method comprising:

distorting an optical ray's motion by means of an amplitude-phase mask inserted in an optical system, in a direction close to or coinciding with a direction orthogonal to distortions caused by aberrations related to a lack of focus within an optical system that exhibits rotational symmetry according to a predetermined distortion function;

capturing a formed distorted intermediate image of the object by means of an optical-electronic converter; and removing the distortions introduced by said amplitude-phase mask and the optical system with the help of matched spatial filtering of the distorted intermediate image.

2. The method of claim 1, wherein a meridional/sagittal components-ratio of a predetermined distortion of an optical ray's motion is determined in such a way that the ray's intersections with the plate of optimal focusing of the intermediate image lie within ring zones of the radii, the magnitudes of which exceed the values of lateral ray displacements caused by distortions in focus for all rays equal in absolute value as to lack of focusing and crossing the amplitude-phase mask at identical distances from its center.

3. The method of claim 1, wherein an optical-electronic conversion of a distorted intermediate image is processed by an optically addressed spatial light modulator, while matched spatial filtering of the distorted intermediate image is performed within coherent light with an application of double optical Fourier-transforming.

4. The method according to claim 1, wherein, in the course of forming a distorted intermediate image of an object through a predetermined distortion of said optical ray's motion by means of said amplitude-phase mask, a rotational movement is imparted to the latter.

5. An optical image formation device of the object within incoherent light comprising an optical system with at least one lens (1, 2, 3, 4, 5) and with, positioned in series:

means for distorting an optical ray's motion embodied in an amplitude-phase mask;

an optical-electronic converter (9) for capturing a formed distorted intermediate image with a capacity for removing distortions introduced by the amplitude-phase mask and by the optical system, said amplitude-phase mask being embodied in the form of two lenticular screens (12, 13) positioned coaxially and co-focally with lenses (14) along concentric circumferences within each screen;

at least one of the lenticular screens (12, 13) being installed with a secured option of turning around the optical axis of the system by an angle that is regulated by the value of a predefined distortion of optical rays motion of the said system.

6. An optical image formation device according to claim 5, wherein at least in one of the lenticular screens (12, 13) of the amplitude-phase mask, the lenses are embodied in the form of diffracting optical elements with a direction to the diffracting structure's strokes that is close to a radial direction and exhibiting monotonous changes of the direction and of frequency of strokes as the distance from the center of the diffracting element grows, making it possible to secure an invariant impulse response in the focus of the optical system.

7. A optimal image formation device according to claim 6, wherein the direction of strokes of a diffracting structure of a diffracting optical element is determined by the following equation:

$$\Phi = \Phi_i + k\rho^2,$$

where:
- $\Phi$ and $\rho$ = normalized polar coordinates in the plane of the amplitude and phase coding mask;
- $\Phi_i$ = a polar angle defining the direction of the i-th stroke at the point of (the coordinates') origin;
- k = a constant coefficient.

8. A optical image formation device according to claim 6, wherein the strokes of a diffracting structure of a diffracting optical element are accomplished with a triangular profile, the height of which is selected subject to the provision of procuring the maximum diffracting efficiency of that structure.

* * * * *